(12) United States Patent
Mahajan et al.

(10) Patent No.: US 12,711,168 B1
(45) Date of Patent: Aug. 18, 2026

(54) ARTIFICIAL-INTELLIGENCE MULTIMODAL CROSS-LINGUAL CROSS-DATABASE ITEM SEARCH, CLASSIFICATION, AND SET COMPARE

(71) Applicant: Amazon Technologies, Inc., Seattle, WA (US)

(72) Inventors: Kriti Mahajan, Mumbai (IN); Raghava Gupta Valiveti, Bengaluru (IN); Sandipan Das, Bangalore (IN); MinGwan Kim, Bellevue, WA (US); Ramya Toshniwal, Boida (IN); Pierre Akira Gauville, Seattle, WA (US); Pooja Patel, Bellevue, WA (US); Ambarish Nagarajan, Bothell, WA (US); Somana Konganda, Seattle, WA (US); Aniesh Aravind, Snoqualmie, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 19/019,142

(22) Filed: Jan. 13, 2025

(51) Int. Cl.

| | |
|---|---|
| ***G06F 16/93*** | (2019.01) |
| ***G06F 16/334*** | (2025.01) |
| ***G06F 16/35*** | (2019.01) |
| ***G06F 16/9032*** | (2019.01) |
| ***G06F 16/9038*** | (2019.01) |
| ***G06F 40/58*** | (2020.01) |
| ***G06T 11/00*** | (2006.01) |

(52) U.S. Cl.
CPC ............ *G06F 16/334* (2019.01); *G06F 16/35* (2019.01); *G06F 40/58* (2020.01); *G06T 11/00* (2013.01)

(58) Field of Classification Search
None
See application file for complete search history.

(56) References Cited

U.S. PATENT DOCUMENTS

| | | | |
|---|---|---|---|
| 8,275,726 B2 * | 9/2012 | Tsaparas | G06F 16/906 706/62 |
| 9,922,303 B2 * | 3/2018 | Chikovani | G06Q 10/10 |
| 10,062,173 B1 * | 8/2018 | Padfield | G06V 20/20 |
| 11,734,242 B1 * | 8/2023 | Bouyarmane | G06F 16/51 707/737 |
| 12,499,478 B2 * | 12/2025 | Sortur | G06Q 30/0629 |
| 2021/0233130 A1 * | 7/2021 | Liu | G06F 40/30 |
| 2025/0061500 A1 * | 2/2025 | Charlton | G06Q 30/0621 |

* cited by examiner

*Primary Examiner* — Debbie M Le
(74) *Attorney, Agent, or Firm* — Knobbe, Martens, Olson & Bear, LLP

(57) ABSTRACT

A system processes items from a target electronic catalog and searches a source electronic catalog for a matching item. The system uses identifying marks, item categories, and item names to filter items. The system uses a multimodal classification process to compare a candidate source item and the target item. The system uses an image generator model to generate image data from the item name for the target item. The system uses a computer vision system to determine matching images. If there are matching images, then the system determines that the source electronic catalog has an equivalent item for the target item from the target electronic catalog. Otherwise, there is not a match, and the system determines that the source electronic catalog does not have an equivalent item for the target item from the target electronic catalog.

20 Claims, 8 Drawing Sheets

ARTIFICIAL-INTELLIGENCE MULTIMODAL CROSS-LINGUAL CROSS-DATABASE ITEM SEARCH, CLASSIFICATION, AND SET COMPARE

BACKGROUND

Electronic catalogs, which can be referred to as databases, can contain millions of items. Each item may be associated with multi-modal data, such as, but not limited to, text (such as item descriptions, item names, etc.) and/or images. Electronic catalogs can be associated with a particular region, such as a particular country, and be in a particular language. A first entity can desire to introduce an entire electronic catalog currently in a first region to a second region, such as a different country, with translated items. The second region may have a second electronic catalog that is provided by a different entity. The first electronic catalog in the first region can be in a first language and the second electronic catalog in the second language can be in a different, second language. The second electronic catalog may have inconsistent data. For example, items in the second electronic catalog may be missing images, text descriptions, and/or other data and the item images that are present may be blurry. Ideally, the first entity can compare the set of items from the first electronic catalog with the set of items from the second electronic catalog. Based on the comparison, the first entity would like to determine the overlap between the two sets and any differences or gaps between the two sets.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1A:
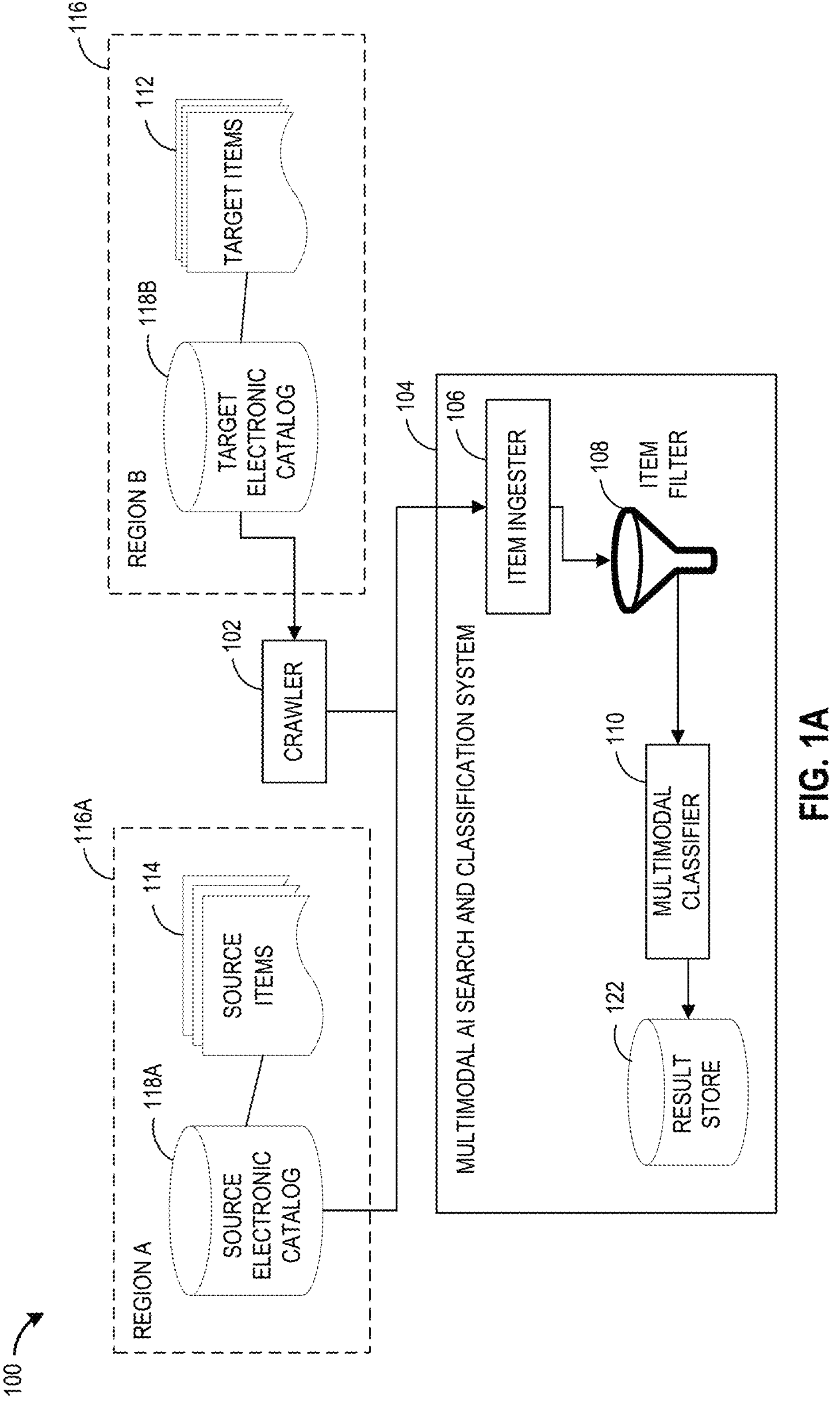
FIG. 1A is a schematic block diagram depicting an illustrative environment including a multimodal artificial-intelligence search and classification system.

As described above, it would be advantageous to compare electronic catalogs to determine the overlap between data sets from the catalogs and any differences or gaps between the data sets. However, some data items (especially the data from a target electronic catalog) may not have any images at all, may be missing text descriptions, or if an image is present the image may be of lower quality and/or formatted different than images from another electronic catalog. The electronic catalogs in different regions can be in different languages. The differences between data items from different electronic catalogs make automatic comparisons between the catalogs technically challenging. Accordingly, there are no existing tools that are capable of automatically comparing two different multi-modal item data sets where some of the data may be lower in quality than the other and the data sets may have other differences, such as being in different languages.

Generally described, aspects of the present disclosure are directed towards solutions for artificial-intelligence ("AI") multimodal/cross-lingual/cross-database large-scale item search, classification, and set comparisons. As described herein, electronic catalogs can have millions of items. When comparing items between different electronic catalogs from different sources, it is a technically challenging problem to determine whether or not one item from an electronic catalog has a matching item in another electronic catalog with, for example, a million different items. For catalog purposes, what constitutes a match between items is subject to the particular embodiment and context. For example, as used herein, a match need not be an exact match between items, but rather two items can match if they have the same or similar identifying mark (such as brand), have similar item categories, and similar associated descriptive text (such as item name). For catalog purposes, items from different catalogs could match even though the items are different colors or otherwise have other relatively minor variations.

The systems and methods described herein can achieve improved accuracy and performance with filtering, classification, and/or AI techniques when performing large-scale item search, classification, and set comparisons. In some embodiments, there can be a source electronic catalog in a first region and a target electronic catalog in a second region. A target language can be an official or used language in the second region. The target language can be a less widely used language worldwide, such as, but not limited to, Korean, Indonesian, Vietnamese, etc. A source language can be an official or used language in the first region. Accordingly, searchable data regarding items from the target electronic catalog may exclusively be available in the target language. The source electronic catalog can (although this is not a requirement) generally have higher quality data, such as consistently having catalog quality images for items. In contrast, the target electronic catalog may not have an image for a majority of their items and the images the target catalog has may be of poor quality. The data for items that the target electronic catalog may have includes the following: identifying mark, item category, and an item name (such as a title for the item). Accordingly, for many items from the target electronic catalog, a multimodal AI search and classification system can individually process a particular target item from the target electronic catalog and search the source electronic catalog for a matching item. The system can first determine a set of identifying marks from the source electronic catalog since many items are associated with the same identifying mark and it is therefore more efficient to first search by identifying mark. The system checks if the source electronic catalog has an identifying mark similar to the identifying mark for the target item. If not, the system can shortcut to a determination that the target item is not found in the source electronic catalog. If the identifying mark test is passed, the system proceeds with the search and classification process.

The system translates the item name for the target item into the source language. The system can identify the top-K similar source items, first by filtering on identifying mark and item category, and then performing a textual comparison between the item name for filtered source items and the translated item name for the target item. The system can re-rank (such as by using one or more textual comparison techniques) and select one or more candidate source items from the top-K similar source items. The system then uses a multimodal classification process to compare the candidate source item and the target item. Again, for the sake of efficiency, the system can first perform a textual comparison between the item name for the candidate source item and the translated item name for the target item. If the textual comparison satisfies a threshold, then the system shortcuts the classification process and indicate that there is a match between the candidate source item and the target item, thereby determining that the source electronic catalog has an equivalent item for the target item from the target electronic catalog. Otherwise, the system uses an image generator model (whether or not the target electronic catalog has a catalog image for the target item or not) to generate image data from the item name for the target item. The multimodal AI search and classification system uses a computer vision system to determine an image comparison indicator from the generated image data and catalog image data for the candidate source item. If the image comparison indicator satisfies a threshold, then the system determines that there is a match between the candidate source item and the target item, thereby determining that the source electronic catalog has an equivalent item for the target item from the target electronic catalog. Otherwise, there is not a match, and the system can determine that the source electronic catalog does not have an equivalent item for the target item from the target electronic catalog. Accordingly, the multimodal AI search and classification system can perform a fuzzy set comparison between electronic catalogs with millions of items in an efficient manner.

As used herein, an "electronic catalog" stores information about items that may be listed for sale, lease, etc. by an electronic marketplace, sellers, merchants and/or other users. Electronic catalogs include databases and/or data stores. As used herein, an "item" can refer to a data object that can represent a specific thing that has one or more definable attributes. For example, an item can represent things such as, but not limited to, a physical product. As used herein, a "match" between two items from different electronic catalogs need not be exact. For example, matching items may refer to physical products that are different colors. There can be a many-to-many relationship between matching items between a source electronic catalog and a target electronic catalog. For example, multiple source items (such as smartphones with different storage availabilities) can match the same target item and vice versa. The same target item could match a hundred different source items.

The systems and methods described herein may improve cross-database comparison technology, which can be referred to as benchmarking. Benchmarking can refer to identifying overlaps and gaps in items between electronic catalogs or databases, which can be crucial for assessing competitiveness between catalogs. There can exist catalog benchmarking tools that work domestically or with similar data sets; however, there are no existing tools that are capable of automatically comparing two different multimodal item data sets where some of the data may be lower in quality than the other and the data sets may have other differences, such as being in different languages. The target electronic catalogs can have sparse/low volume data, which can eliminate the possibility of fine-tuning options. The filtering, classification, and/or AI techniques described herein can enable improved accuracy scores for database comparisons. Accordingly, the systems and methods described herein may improve cross-database comparison technology.

Turning to FIG. 1A, a schematic block diagram is shown an illustrative environment 100 including a multimodal AI search and classification system 104. The environment 100 can include a source electronic catalog 118A, a target electronic catalog 118B, a crawler 102, and a multimodal AI search and classification system 104. The source electronic catalog 118A can be catalog for a first region 116A (here Region A) and the target electronic catalog 118B can be a catalog for a second region 116B (here Region B). The source electronic catalog 118A contains source items 114. The source electronic catalog 118A can contain image data. The source electronic catalog 118A can contain image data of the source items 114 with clear backgrounds and multiple views of the item. The target electronic catalog 118B contains target items 112. The source electronic catalog 118A and the multimodal AI search and classification system 104 can be operated by the same entity. The target electronic catalog 118B can be operated by a different entity.

The electronic catalogs 118A, 118B may each store information about items that may be listed for sale, lease, etc. by an electronic marketplace, sellers, merchants and/or other users. The item information in the electronic catalogs 118A, 118B may be viewable by end users through a browsable or searchable user interfaces in which each item may be described in association with a network page, such as an item detail page, describing the item. Each item detail page may include, for example, item image(s) and description, customer ratings, customer and professional reviews, sales rank data, lists of related items, and/or other types of supplemental data that may assist consumers in making informed acquisition decisions. As described herein, the target electronic catalog 118B may have less information regarding items than the source electronic catalog 118A. The electronic catalogs 118A, 118B can each provide network pages that enables users to interact with items, such as selecting, acquiring, and/or consuming items (such as watching or playing a media content item), where available. End users may, in some embodiments, locate specific item detail pages within the electronic catalog 118A, 118B by executing search queries, navigating a browse tree, and/or using various other navigation techniques. As used herein, an item can refer to a data object that can represent a specific thing that has one or more definable attributes.

The crawler 102 can process target items 112 from the target electronic catalog 118B. As described herein, the target electronic catalog 118B can make the target items 112 available via network pages, which can be systematically accessed by the crawler 102. For each target item, the crawler 102 can extract data, such as, but not limited to, identifying mark, item category, and item name. An item ingester 106 can receive extracted data for the target items 112. The item ingester 106 can receive priority-related data, such as data indicating which items have 5-star reviews or have high acquisition rates. When the multimodal AI search and classification system 104 processes target items, the system 104 can prioritize the target items based on the priority-related data. In the case of multiple matching items, such as in the case of many-to-many matches between source items and target items, the multimodal AI search and classification system 104 can use priority-related data as criteria to select a final match. For example, between two source items matching with the same target item, the source item with the highest acquisitions or reviews can be selected as the final match with the target item.

Prioritizing items based on priority-related data can be referred to as head selection. Head selection can refer to the process of choosing the most important or primary items from a group, where "head" items contribute the majority of acquisitions volume and turnover, even if their margins might be lower compared to other "tail" selections with higher margins but lower acquisitions volume. Head selection thus selects the key products that drive the most activity within a category. For example, a target electronic catalog can have ten million items. The multimodal AI search and classification system 104 can prioritize processing a threshold portion of items from the target catalog that satisfy a threshold (such as the top 10% highest rated (such as five star) target items) instead of matching the entire target electronic catalog.

The multimodal AI search and classification system 104 can include the item ingester 106, an item filter 108, a multimodal classifier 110, and a result store 122. The item ingester 106 can also receive data for the source items 114. The ingester 106 can process data for the target items 112 and/or the source items 114. For example, the ingester 106 can store data objects in a data store (not illustrated) for each item with attributes, such as, but not limited to, identifying mark, item category, and item name. The ingester 106 can store/receive catalog images for items, such as images for the source items 114 that are consistent and high quality. In some embodiments, the ingester 106 can clean data for the items, such as by removing special characters, such as, but not limited to, dollar signs or hash tags.

The multimodal AI search and classification system 104 can process target items 112. As described herein, the multimodal AI search and classification system 104 can translate text (such as item names) for the target items 112 from a target language into the source language. For each target item, the item filter 108 can determine potential candidate source items from the source items 114. As described herein, the item filter 108 can filter/search or identifying mark, item category, item text (such as item name). The item filter 108 can rank the candidate source items. The multimodal classifier 110 can receive a candidate source item and a target item and determine a classification whether there is a match between the candidate source item and the target item. The multimodal classifier 110 can perform text comparison on text fir the candidate source item and the target item. As described herein, the target item may be missing an image or the image may be of low quality. For example, over 70% of the target items 112 may be missing any image data. Accordingly, the multimodal classifier 110 can, for all of the target items, generate images based on text (such as item name) for the target item. The multimodal classifier 110 can use a computer vision system on the generated image for the target item and a catalog image for the source item to determine sufficient similarity between the two images. The multimodal classifier 110 can, based on text comparison and/or image comparison, determine that there is a match between the candidate source item and the target item, thereby determining that the source electronic catalog 118A has an equivalent item for the target item from the target electronic catalog 118B. Otherwise, there is not a match, and the system 104 determines that the source electronic catalog 118A does not have an equivalent item for the target item from the target electronic catalog 118B.

The multimodal classifier 110 can store a classification result in the result store 122. As used herein, a "store" or "database" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage. The source electronic catalog 118A and the target electronic catalog 118B can each include a database to store the source items 114 and the target items 112, respectively.

The components of the environment 100, such as the multimodal AI search and classification system 104, the source electronic catalog 118A, and/or the target electronic catalog 118B, can communicate over a network. The network may be any wired network, wireless network, or combination thereof. In addition, the network may be a personal area network, local area network, wide area network, cable network, satellite network, cellular telephone network, or combination thereof. In addition, the network may be an over-the-air broadcast network (e.g., for radio or television) or a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications ("GSM") network, a Code Division Multiple Access ("CDMA") network, a Long-Term Evolution ("LTE") network, or any other type of wireless network. The network can use protocols and components for communicating via the Internet or any of the other aforementioned types of networks, such as HTTP, TCP/IP, and/or UDP/IP.

The multimodal AI search and classification system 104 may be embodied in a plurality of devices. A device of the multimodal AI search and classification system 104 may include a network interface, memory, hardware processor, and non-transitory computer-readable medium drive, all of which may communicate with each other by way of a communication bus. The network interface may provide connectivity over the network and/or other networks or computer systems. The hardware processor may communicate to and from memory containing program (a.k.a., computer-executable) instructions that the hardware processor executes in order to operate the multimodal AI search and classification system 104. Memory generally includes RAM, ROM, and/or other persistent and/or auxiliary non-transitory computer readable storage media.

Additionally, in some embodiments, the multimodal AI search and classification system 104 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

The solutions described herein may be inextricably tied to computer technology. For example, the crawler 102 extracting information from electronic catalogs and techniques for large-scale cross-database comparison operations do not exist in any other subject matter areas. Therefore, the solutions described herein are necessarily rooted in computer technology in order to overcome problems specifically arising in the realm of cross-database comparison operations.

Figure 1B:
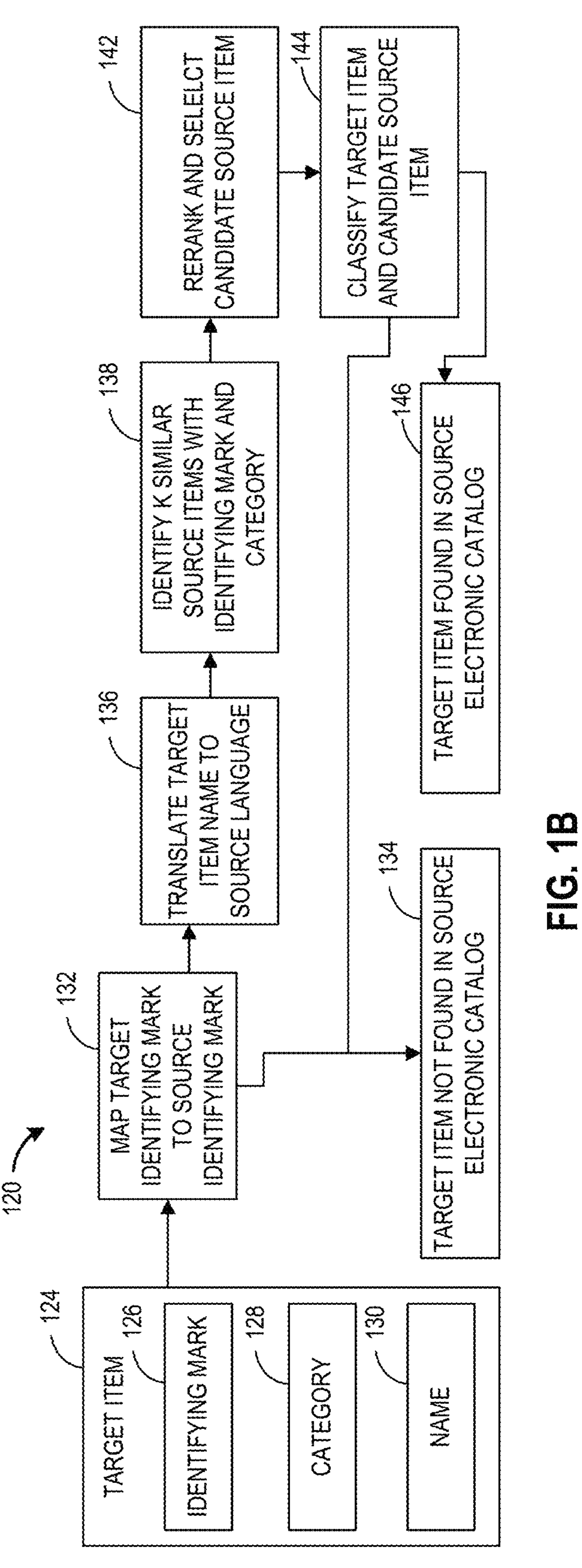
FIG. 1B depicts an illustrative architecture of the multimodal artificial-intelligence search and classification system referenced in the environment depicted in FIG. 1A.

FIG. 1B depicts an architecture 120 of the multimodal AI search and classification system 104 referenced in FIG. 1A. As described herein, the multimodal AI search and classification system 104 receives target item data 124. The target item data 124 includes an identifying mark 126, an item category 128, and an item name 130. The architecture 120 can use language models, such as a foundational large language model ("LLM") and/or a multilingual machine translation model ("translation model"). The language models can come in different sizes. Each language model can be trained on billions or trillions of tokens and can have billions of parameters. An LLM can be trained from text from languages with the most speakers (such as text from 10 or 20 languages with the most speakers) and can focus on languages with particular types of alphabets (such as Latin and Cyrillic alphabets). A translation model can be trained on even more languages and, for example, one such translation model can directly translate between the 9,900 directions of 100 languages. Language models can be multimodal. For example, some language models can receive image data as input and respond to a question prompt regarding the image data.

The architecture 120 can begin at block 132 that maps the target identifying mark 126 to a source identifying mark. For example, the item filter 108 can receive or determine a set of source identifying marks from the source electronic catalog 118A. The item filter 108 can compare multiple source identifying marks with the target identifying mark 126. In some embodiments, the item filter 108 generates an embedding for each of the target identifying mark 126 and the source identifying mark with a language model, such as a sentence-transformer that given the marks as input, outputs an embedding (such as an embedding vector) that can capture semantic information. An example sentence-transformer is all-MiniLM-L6-v2. The item filter 108 compares the target identifying mark embedding with the source identifying mark embedding with a cosine similarity function. Cosine similarity can be the cosine of the angle between the vectors, i.e., the dot product of the vectors divided by the product of their lengths, which will range from 0 to 1. The item filter 108 determines a match if the cosine similarity satisfies a threshold (such as greater than 0.7).

At block 132, if a match for identifying marks is determined, then the architecture 120 proceeds to block 136 to translate (where applicable) the target item name 130 to the source language. If a match for identifying marks is not determined, then the architecture 120 proceeds to block 134 to report that an item corresponding to the target item data 124 has not been found in the source electronic catalog 118A. Proceeding to the block 134 to report the error state at this stage can be a shortcut, since the architecture 120 here prioritizes searching identifying marks (which there are a lot fewer of relative to source items) without having to search any specific source items.

At block 136, where applicable, the item filter 108 can translate the target item name 130 from the target language to the source language. In some embodiments, if the source language and the target language are the same, then this step can be skipped. The item filter 108 can, with a translation model, generate a translated item name in the source language by providing the item name in the target language to the translation model. For example, if the source language is German and the target language is Korean, the item filter can translate the target item name 130 in Korean into German. The translation model can receive the source and target languages as input parameters. An example translation model is a multilingual encoder-decoder that can perform multilingual translations for 100 different languages.

In other embodiments, the item filter 108 can translate the target item name 130 to an intermediate language such as English. However, during testing, translating item text to an intermediate language (and also translating source text into the intermediate language), may have had worse accuracy then translating into the source language. Accordingly, translating item text to the source language can result in an improvement to how the computer works by resulting in more accurate database set comparisons. Also, since the source items are already in the source language, translating the target items into the source language results in less language model translations and improves computer performance and uses fewer computing resources. As used herein, the term "computing resource" can refer to a physical or virtual component of limited availability within a computer system. Computing resources can include, but are not limited to, computer processors, processor cycles, and/or memory.

At block 138, a subset of source items can be determined. The item filter 108 can first constrain the search space of source items by filtering on identifying mark and item category. In some embodiments, the item filter 108 can use semantic search for constraining the search space on identifying mark and item category. The item filter 108 generates an embedding for each of the target identifying mark 126, the source identifying mark, the item category 128, and a source item category with a language model/sentence-encoder that given the text as input, outputs an embedding (such as an embedding vector). The item filter 108 can compare the foregoing information with a cosine similarity function and a corresponding threshold test. From the constrained search space, the item filter 108 can further use the target item name 130 (which can be translated) and source item names to perform further text comparisons. Specifically, the item filter 108 generates an embedding for each of the target item name 130 (which can be translated) and source item name with a language model/sentence-encoder (such as Language-agnostic BERT Sentence Encoder (LaBSE)) that given the text as input, outputs an embedding (such as an embedding vector). The item filter 108 compares the target item name embedding with the source item name embedding with a cosine similarity function. The item filter 108 can select the subset of source items based on a threshold, such as selecting the top-K source items with the highest cosine similarity scores.

At block 142, the subset of source items can be re-ranked and candidate source item(s) can be selected. The item filter 108 can calculate a text overlap score between the target item name 130 (which can be translated) and source item names from the subset of source items. The item filter 108 can use one or more methods to calculate the text overlap score, such as a substring match. Example text overlap methods can include, but are not limited to, methods to calculate a jaccard similarity score or an overlap coefficient, which can be referred to as a Szymkiewicz-Simpson coefficient. In some embodiments, the item filter 108 calculates a text overlap score using a Ratcliff/Obershelp string matching algorithm, which calculates the similarity metric between two strings as: twice the number of matching (overlapping) characters between the two strings divided by the total number of characters in the two strings. In other embodiments, the item filter 108 calculates a text overlap score using a Levenshtein distance/ratio. The Levenshtein distance between two strings can be the number of deletions, insertions and substitutions needed to transform one string into another. A Levenshtein ratio can be the Levenshtein distance divided by alignment length. The item filter 108 can use a combination of the cosine similarity scores and a text overlap score to determine candidate source item(s). For example, the item filter 108 can combine the cosine similarity score and a text overlap score and select the top-K highest source items, such as by taking an average or a weighted-average between the cosine similarity score and a text overlap score.

At block 144, the target item and the candidate source item(s) are classified. The multimodal classifier 110 can receive data for the target item and a candidate source item and output a determination whether there is a match or not. Additional details regarding the multimodal classifier 110 are described herein, such as with respect to FIGS. 3A, 3B. In some embodiments, there is a single candidate source item for comparison. In other embodiments, there can be multiple candidate source items, and the multimodal classifier 110 can process each of the candidate source items until a match is found or all of the candidate source items for the target item data 124 have been processed. If the multimodal classifier 110 outputs a classification match, then the architecture 120 proceeds to the block 146 to report that a corresponding source item has been found in the source electronic catalog 118A matching the target item data 124. Otherwise, the multimodal classifier 110 outputs a classification mismatch and the architecture 120 proceeds to the block 134 to report that an item corresponding to the target item data 124 has not been found in the source electronic catalog 118A. The results of the multimodal classifier 110 can be stored in the result store 122.

As described herein, the architecture 120 of the multimodal AI search and classification system 104 can prioritize both accuracy and efficiency/latency that results in improvement to the operation of a computer. For example, with respect to database set comparisons, the multimodal AI search and classification system 104 may perform approximately one million unique comparisons. In some cases, the entity may want to perform database comparisons once a month for example. If each target item to source item comparison takes one minute, then the comparison process for a million target items would exceed a month and be unacceptable. Moreover, if the target electronic catalog has k items and the source electronic catalog has n items, then a naïve approach to look for matching source items would be to check each of the target items with all of the items from the source electronic catalog, which has a computational complexity of O(n*k). As described herein, the architecture 120 of the multimodal AI search and classification system 104 can quickly find mismatches if, for example, an identifying mark is not found in the source electronic catalog. Next, the architecture uses a series of filters to narrow down source items by identifying mark, item category, and item name. As described herein, the text comparisons can use fast comparison methods, such as using language models that output embeddings that can be compared with mathematical functions (such as cosine similarity functions), where determining the embeddings and performing individual comparisons can take milliseconds. This approach can also eliminate the need for fine-tuning, which is advantageous in situations where there is sparse data of target items. Moreover, since the source data items are filtered down to a much smaller subset of candidate source item(s) (such as a single candidate source item in some embodiments), the architecture 120 can greatly limit the comparison operations, thereby improving processing times and using fewer computational resources. Accordingly, the systems and methods described herein can result in improved database set comparison operations, and, therefore, results in improving the operation of computers.

Figure 1C:
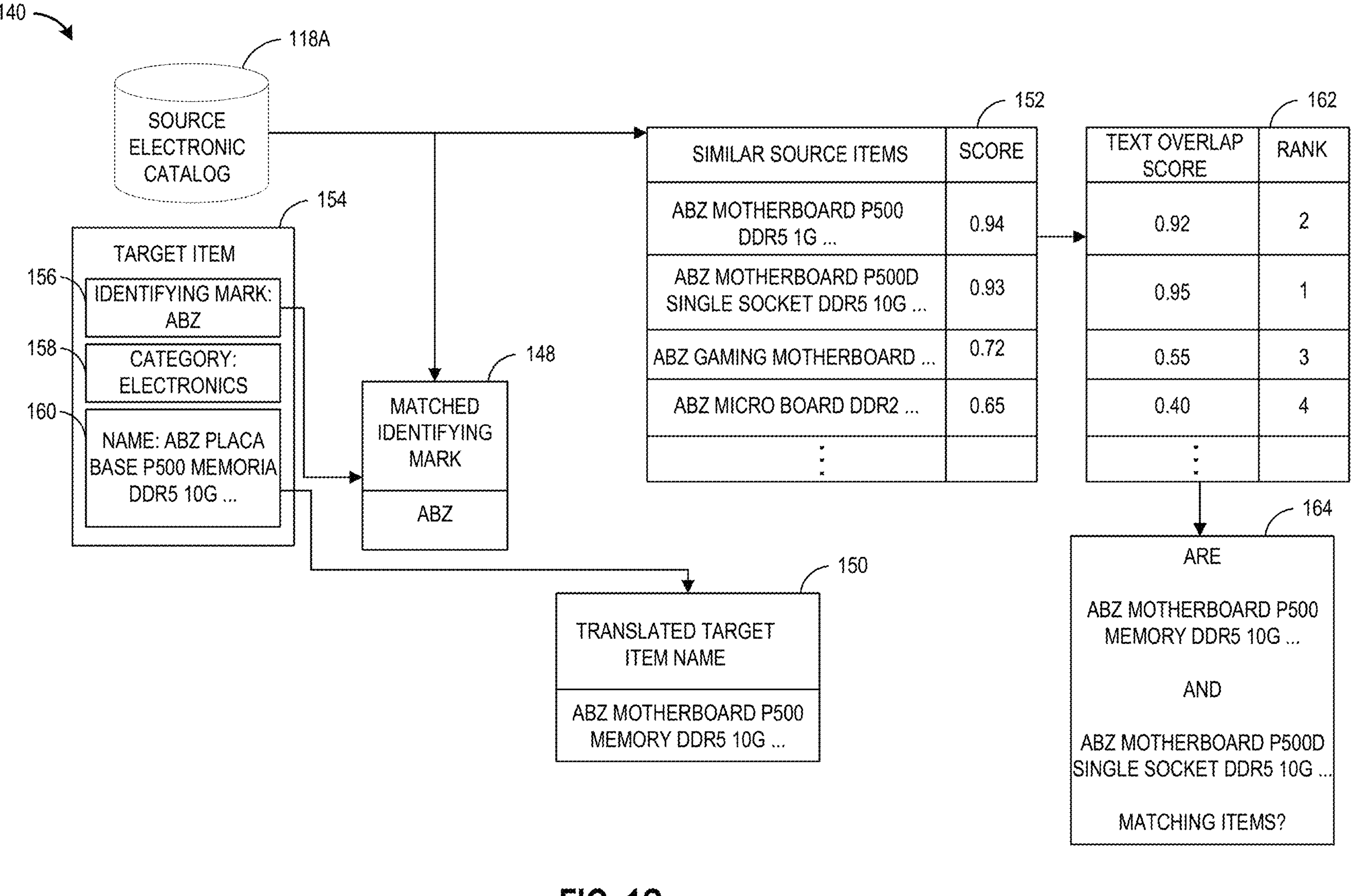
FIG. 1C depicts an example process by the architecture of the multimodal artificial-intelligence search and classification system depicted in FIG. 1B.

FIG. 1C depicts an example process 140 by the architecture 120 (described in FIG. 1B) of the multimodal AI search and classification system 104. The architecture 120 of the multimodal AI search and classification system 104 can receive data for the target item 154. As shown the data for the target item 154 includes: an identifying mark 156 (here the brand “ABZ”), an item category 158 (here “Electronics”), and an item name 160 (here “ABZ Placa Base P500 Memoria DDR5 10G . . . ”), which can be in a target language (here Spanish). The architecture 120 searches data from the source electronic catalog 118A and finds a matching identifying mark 148 (here “ABZ”). Since the source electronic catalog 118A has the identifying mark 148, the architecture 120 generates a translated text for the target item name 150 (here “ABZ Motherboard P500 Memory DDR5 10G . . . ”). The architecture 120 filters on identifying mark and item category. In the constrained search space, the architecture 120 determines similar source items with similarity scores (such as cosine similarity scores) by comparing source item names with the translated text for the target item name 150, as shown in the first table 152.

The architecture 120 calculates a text overlap score and can re-rank the subset of source items with the text overlap score (another similarity score (such as cosine similarity scores) can be used for tiebreakers), as shown in the second table 162. The architecture 120 can calculate a text overlap score based on matching words (0.95 can indicate 95% matching words) between the source item names and the target item name. For text overlap score purposes, two words can match when one word is contained within another word and/or has the same stem (for example, “Motherboard” and “Motherboards” would be a match). As described herein, if two source items have the same text overlap score, then the architecture 120 can use cosine similarity score for tie breakers and select the source item with the higher cosine similarity score.

As shown, the architecture 120 takes the highest ranked source item (here “ABZ Motherboard P500D Single Socket DDR5 10G . . . ”) as a candidate source item. At block 164, the architecture performs multimodal classification by comparing the target item (here “ABZ Placa Base P500 Memoria DDR5 10G . . . ”) and the candidate source item (here “ABZ Motherboard P500D Single Socket DDR5 10G . . . ”). Additional details regarding multimodal classification are described herein, such as with respect to FIGS. 3A, 3B.

Figure 2:
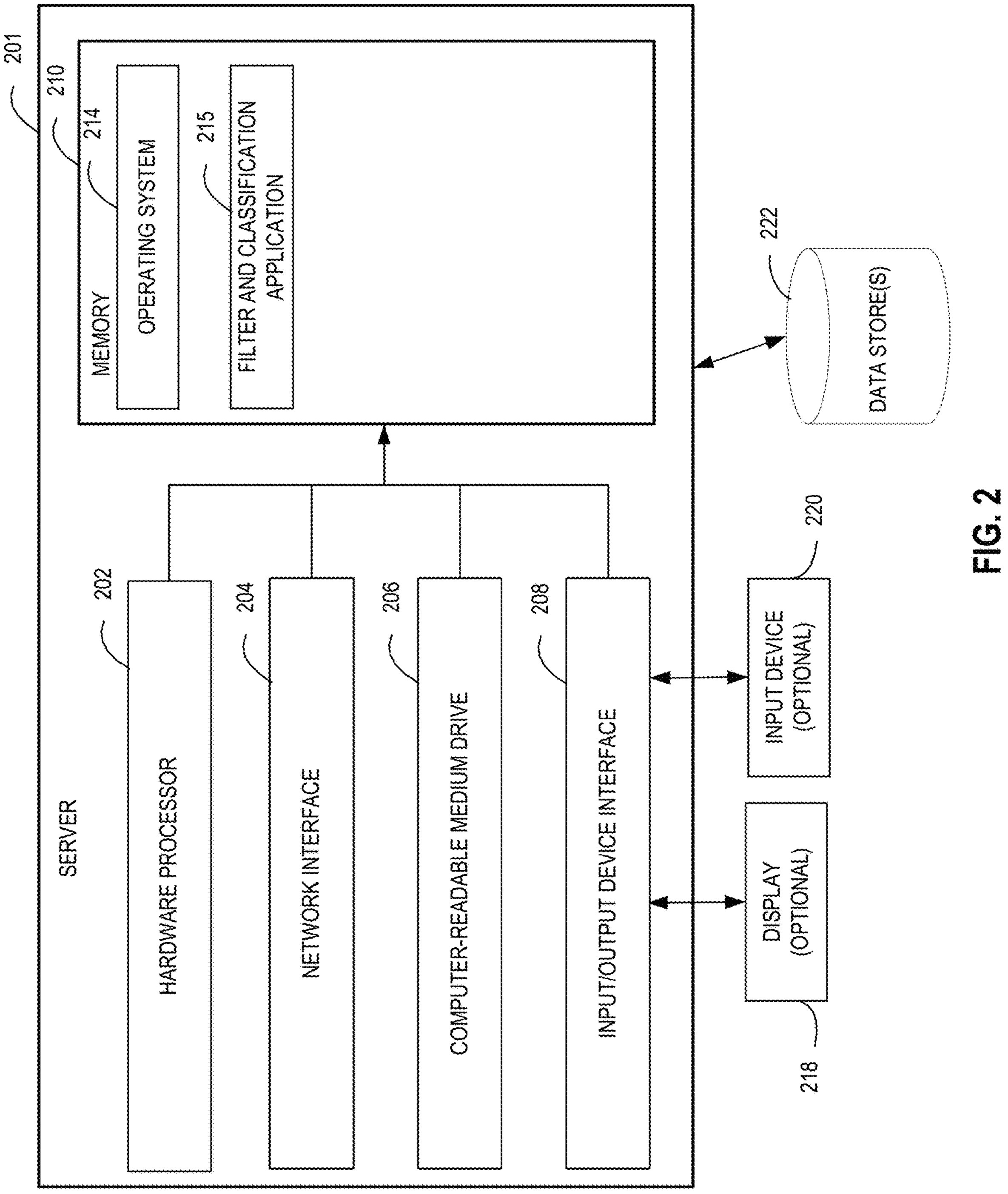
FIG. 2 is a schematic block diagram depicting can illustrative general architecture of a server for implementing aspects of the multimodal artificial-intelligence search and classification system referenced in the environment depicted in FIG. 1A.

FIG. 2 is a schematic diagram of an illustrative general architecture of a server 201 for implementing the multimodal AI search and classification system 104 referenced in the environment 100 in FIG. 2. In particular, a server 201 can be used to implement the item filter 108 and/or the multimodal classifier 110. The server 201 includes an arrangement of computer hardware and software components that may be used to execute the filter and classification application 215. The general architecture of FIG. 2 can be used to implement other devices described herein, such as the crawler 102 referenced in FIG. 1A. The server 201 may include more (or fewer) components than those shown in FIG. 2. Further, other computing systems described herein may include similar implementation arrangements of computer hardware and/or software components.

The server 201 for implementing the multimodal AI search and classification system 104 may include a hardware processor 202, a network interface 204, a non-transitory computer-readable medium drive 206, and an input/output device interface 208, all of which may communicate with one another by way of a communication bus. As illustrated, the server 201 is associated with, or in communication with, an optional display 218 and an optional input device 220. The network interface 204 may provide the server 201 with connectivity to one or more networks or computing systems. The hardware processor 202 may thus receive information and instructions from other computing systems or services via a network. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen.

The memory 210 may contain specifically configured computer program instructions that the hardware processor 202 executes in order to implement one or more embodiments of a device within the multimodal AI search and classification system 104. The non-transitory computer-readable medium drive 206 can store the computer program instructions. The memory 210 generally includes RAM, ROM and/or other persistent or non-transitory computer-readable storage media. The memory 210 may store an operating system 214 that provides computer program instructions for use by the hardware processor 202 in the general administration and operation of the device within the multimodal AI search and classification system 104.

The memory 210 may include the filter and classification application 215 that may be executed by the hardware processor 202. In some embodiments, the filter and classification application 215 may implement various aspects of the present disclosure. The filter and classification application 215 can filter source items and efficiently compare target and source items to determine overlap and gaps between items in different electronic catalogs. The server 201 can communicate with the data store(s) 222. The data store(s) 222 can store data for items and/or the results of item comparisons.

Figure 3A:
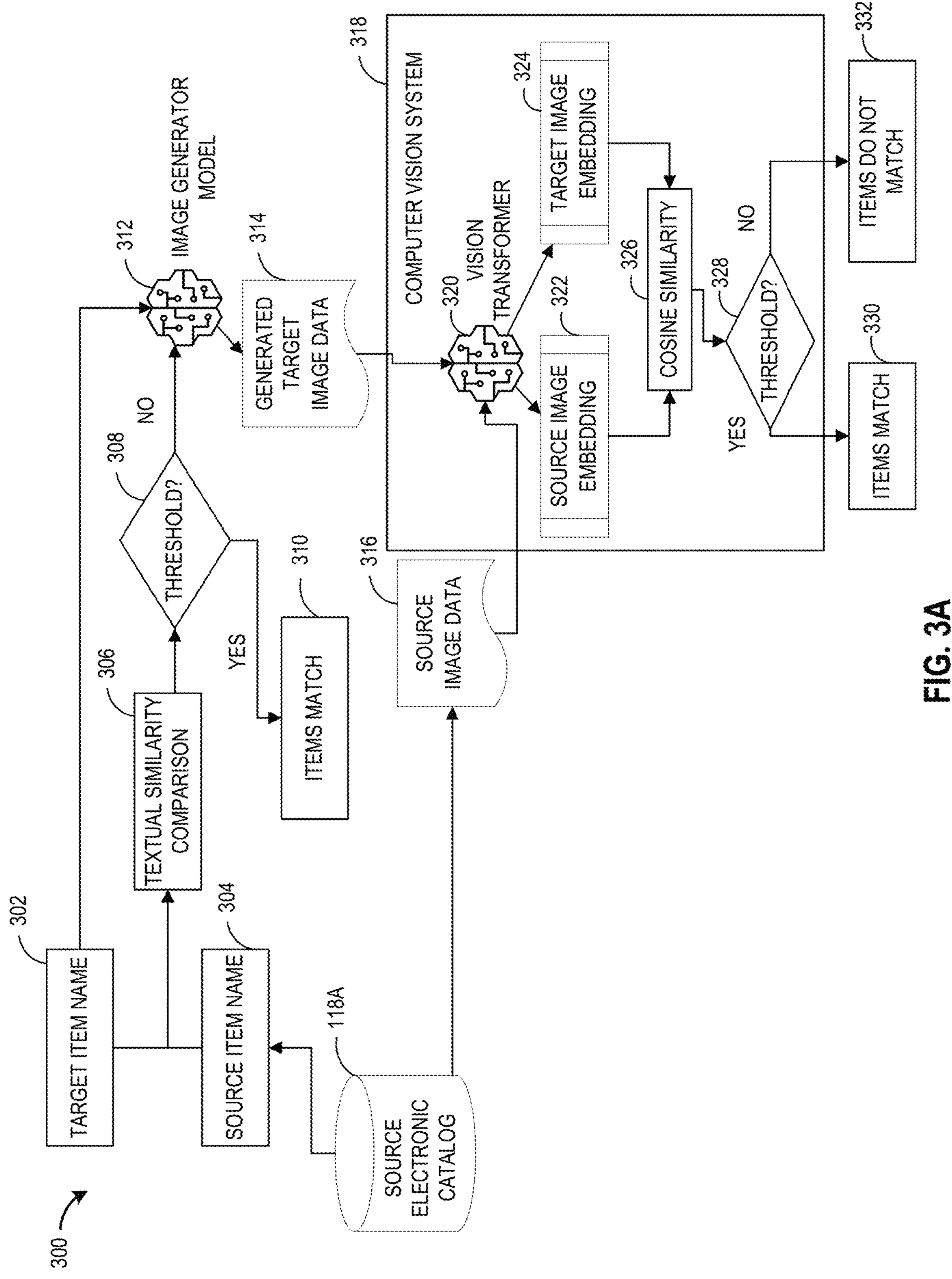
FIG. 3A depicts an illustrative architecture of a multimodal classifier of the multimodal artificial-intelligence search and classification system referenced in the environment depicted in FIG. 1A.

FIG. 3A depicts an architecture 300 of the multimodal classifier 110 of the multimodal artificial-intelligence search and classification system 104. The architecture 300 of the multimodal classifier 110 can result in a classification of a target item and a source item, i.e., whether there is a match between the target item and the source item. The architecture 300 of the multimodal classifier 110 can receive the target item name 302 (which can be translated). The architecture 300 can receive the source item name 304 from the source electronic catalog 118A.

At block 306, a textual similarity comparison is performed and a similarity indicator is determined. In some embodiments, the architecture 300 of the multimodal classifier 110 can determine a similarity indicator (such as a chunked similarity score) from the target item name 302 and the source item name 304. The multimodal classifier 110 can calculate chunked similarity via splitting text into smaller chunks (such as three-word chunks), then use a similarity metric, such as cosine similarity, to compare the vector representations of each chunk. The multimodal classifier 110 can identify sections where the meaning is relatively consistent and splitting when a significant semantic shift occurs, often using a predefined threshold to determine chunk boundaries. In other words, the multimodal classifier 110 can measure how similar consecutive chunks of text are to each other based on their embedded representations. The calculated chunked similarity score can be a value between 0 and 1.

In some embodiments, the multimodal classifier 110 uses a mean chunk cosine similarity. Under mean chunk cosine similarity, the multimodal classifier 110 classifies an item pair as a match if the average cosine similarity across chunks satisfies a threshold (such as 0.7). In some embodiments, the multimodal classifier 110 uses a maximum chunk cosine similarity. Under maximum chunk cosine similarity, the multimodal classifier 110 classifies an item pair as a match if the highest single chunk similarity satisfies a threshold (such as 0.7).

At block 308, the similarity indicator is compared to a threshold. In some embodiments, the threshold can be 0.7. Therefore, if the chunked similarity score is greater than the threshold, then the architecture 300 proceeds to block 310 to determine there is a match. Otherwise, the architecture 300 proceeds to image processing. Image processing can use computing resources/add latency, and, therefore, only proceeding to image processing if the textual similarity threshold check fails can improve performance of the operation of the architecture 300.

In some embodiments, the architecture 300 can perform a different textual similarity comparison. For example, the architecture 300 can generate a response to a question to a language model based on input to the language model including the target item name 302 (which can be translated), the source item name 304, and prompt instructions. For example, the prompt can instruct the language model to output "SAME" or "DIFFERENT" if the target item name 302 (which can be translated) and the source item name 304 are textually/semantically similar. An example multimodal language model is Claude Sonnet. For architectures 300 that use a question-answering language model, the comparison indicator can be text output (such as "SAME" or "DIFFERENT") and the threshold comparison at block 308 can determine whether the output text matches predefined output. However, for latency purposes, a language model may not be used at block 306 for textual similarity comparison since using a language model here to generate a text response may add too much latency. Accordingly, the architecture 300 can rely on similarity chunking or other text similarity functions (as opposed to language models) to determine textual similarity, which can execute faster/use fewer computing resources than language model usage to generate text responses.

If there is image processing, the image generator model 312 generates target image data 314. An example image generator model 312 is Stable Diffusion. The image generator model 312 can be multilingual. The image generator model 312 can be configured to receive a text prompt and output image data corresponding to the text prompt. The prompt provided to the image generator model 312 can include an instruction for the image generator model 312 to generate a catalog style image (such as having a clear background). The image generator model 312 receives the target item name (which can be in the original target language or not) and generates image data corresponding to the target item name. An advantage of using the image generator model 312 is that the output image data are reviewable and subject to external validation that the matches based on image data are accurate.

Continuing with image processing, a computer vision system 318 receives the generated target image data 314 and the source image data 316 for the candidate source item from the source electronic catalog 118A. The computer vision system 318 outputs a determination whether the items match 330 or the items do not match 332. In some embodiments, the computer vision system 318 includes a vision transformer 320. An example vision transformer 320 is ViT. The vision transformer 320 receives the generated target image data 314 and determines a target image embedding 324. The vision transformer 320 receives the source image data 316 and determines a source image embedding 322. The computer vision system 318 determines a cosine similarity value 326 from the target image embedding 324 and the source image embedding 322.

At block 328, the cosine similarity value is compared to a threshold. In some embodiments, the threshold can be 0.15 for image comparison purposes. Therefore, if the chunked similarity score satisfies the threshold at block 328, then the architecture 300 proceeds to block 310 to determine there is a match. Otherwise, the architecture 300 proceeds to block 332 to determine that the items do not match.

In some embodiments, a different computer vision system 318 can be used by the architecture 300. For example, the computer vision system 318 could be a system (such as a language model with multimodal/image recognition capabilities) that receives the input image data for the two items and outputs a similarity indicator (such as an indicator "SAME" or "DIFFERENT" that indicates whether the two item images are a match or do not match).

The systems and methods described herein can achieve improved accuracy and/or with multimodal AI and efficiency techniques for classification, as described herein. During testing, a true positive rate can refer to the percentage of target items that are correctly identified as being present in a corresponding source electronic catalog; and F1 is an average of precision and recall. During testing between the architecture 300 of the multimodal classifier 110 (with multimodal capabilities) and an alternative architecture that is not multimodal (such as that relies on text comparisons), a true positive rate can improve (such as going from 0.30 to 0.80); and F1 an improve (such as going from 0.50 to 0.80). Moreover, using an image generator model to generate images from text for items some of which already have existing images (albeit that may be poor quality or a different style of image) for item comparison and classification purposes is not well-understood, routine, or conventional. Rather, using an image generator model to generate images from text for items for item comparison and classification purposes yielding unexpected results that showed an improvement in accuracy for classification. Moreover, the architecture 300 of the multimodal classifier 110 at block 308 can perform a threshold test, where, if textual similarity is satisfied, then the architecture 300 can skip image comparison, which can allow the architecture 300 to execute faster and with fewer computing resources. Accordingly, the systems and methods described herein may improve AI classification technology and the operation of a computer.

Figure 3B:
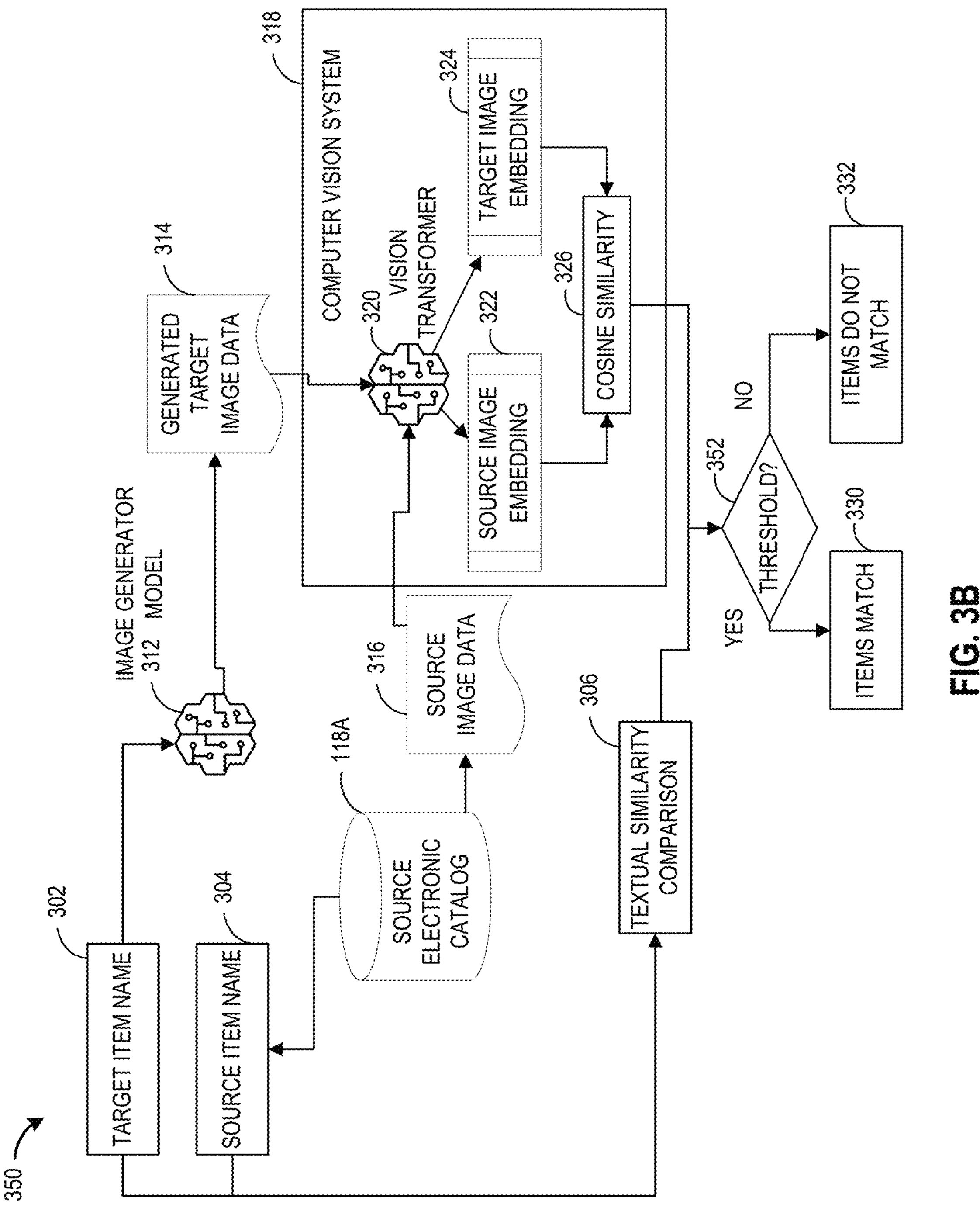
FIG. 3B depicts another illustrative architecture of the multimodal classifier of the multimodal artificial-intelligence search and classification system referenced in the environment depicted in FIG. 1A.

FIG. 3B depicts another architecture 350 of the multimodal classifier 110 of the multimodal artificial-intelligence search and classification system 104. The architecture 350 of FIG. 3B can be similar to the architecture 300 of FIG. 3A. The architecture 350 of FIG. 3B can result in a classification of a target item and a source item. However, unlike the architecture 300 of FIG. 3A that included a shortcut determination if there is sufficient textual similarity, the architecture 350 of FIG. 3B does not have the same shortcut. The architecture 350 of the multimodal classifier 110 can receive the target item name 302 (which can be translated); and the architecture 350 can receive the source item name 304 from the source electronic catalog 118A. Many blocks of FIG. 3B can be similar to/the same as a corresponding block in FIG. 3A. For example, the block 306 of FIG. 3B for performing textual similarity can be similar to/the same as the block 306 of FIG. 3A for performing textual similarity.

At block 306, a textual similarity comparison is performed and a textual similarity indicator is determined. The output of the block for performing textual similarity can be chunked similarity score with a value between 0 and 1. In other embodiments, the architecture 350 can generate a response to a question to a language model based on input to the language model including the target item name 302 (which can be translated), the source item name 304, and prompt instructions. For example, the prompt can instruct the language model to output "SAME" or "DIFFERENT" if the target item name 302 (which can be translated) and the source item name 304 are textually/semantically similar.

As described herein, the image generator model 312 generates target image data 314. The computer vision system 318 receives the generated target image data 314 and the source image data 316 for the candidate source item from the source electronic catalog 118A. The vision transformer 320 receives the generated target image data 314 and determines a target image embedding 324. The vision transformer 320 receives the source image data 316 and determines a source image embedding 322. The computer vision system 318 determines a cosine similarity value 326 from the target image embedding 324 and the source image embedding 322. In other embodiments, the computer vision system 318 is a system (such as a language model with multimodal/image recognition capabilities) that receives the input image data for the two items and outputs a similarity indicator (such as an indicator "SAME" or "DIFFERENT" that indicates whether the two item images are a match or do not match).

At block 352, it can be determined whether the inputs of a textual similarity indicator (such as a chunked similarity score) and the cosine similarity value 326 (or other image similarity indicator) satisfy one or more thresholds. For example, the architecture 350 determines whether the textual similarity indicator satisfies a first threshold (such as the chunked similarity score exceeds a 0.7 threshold). The architecture 350 determines whether the cosine similarity value 326 (or other image similarity indicator) satisfies a second threshold (such as the cosine similarity value 326 exceeds a 0.15 threshold). If both conditions are satisfied (which can be referred to as a logical AND condition), then the architecture 350 can determine that the items match 330; otherwise, the architecture can determine that the items do not match 332.

In other embodiments, the architecture 350 can determine a combined indicator from the textual similarity indicator (such as a chunked similarity score) and the cosine similarity value 326 (or other image similarity indicator). The architecture 350 determines whether the combined indicator satisfies a threshold. If threshold is satisfied, then the architecture 350 can determine that the items match 330; otherwise, the architecture 350 can determine that the items do not match 332.

Figure 4A:
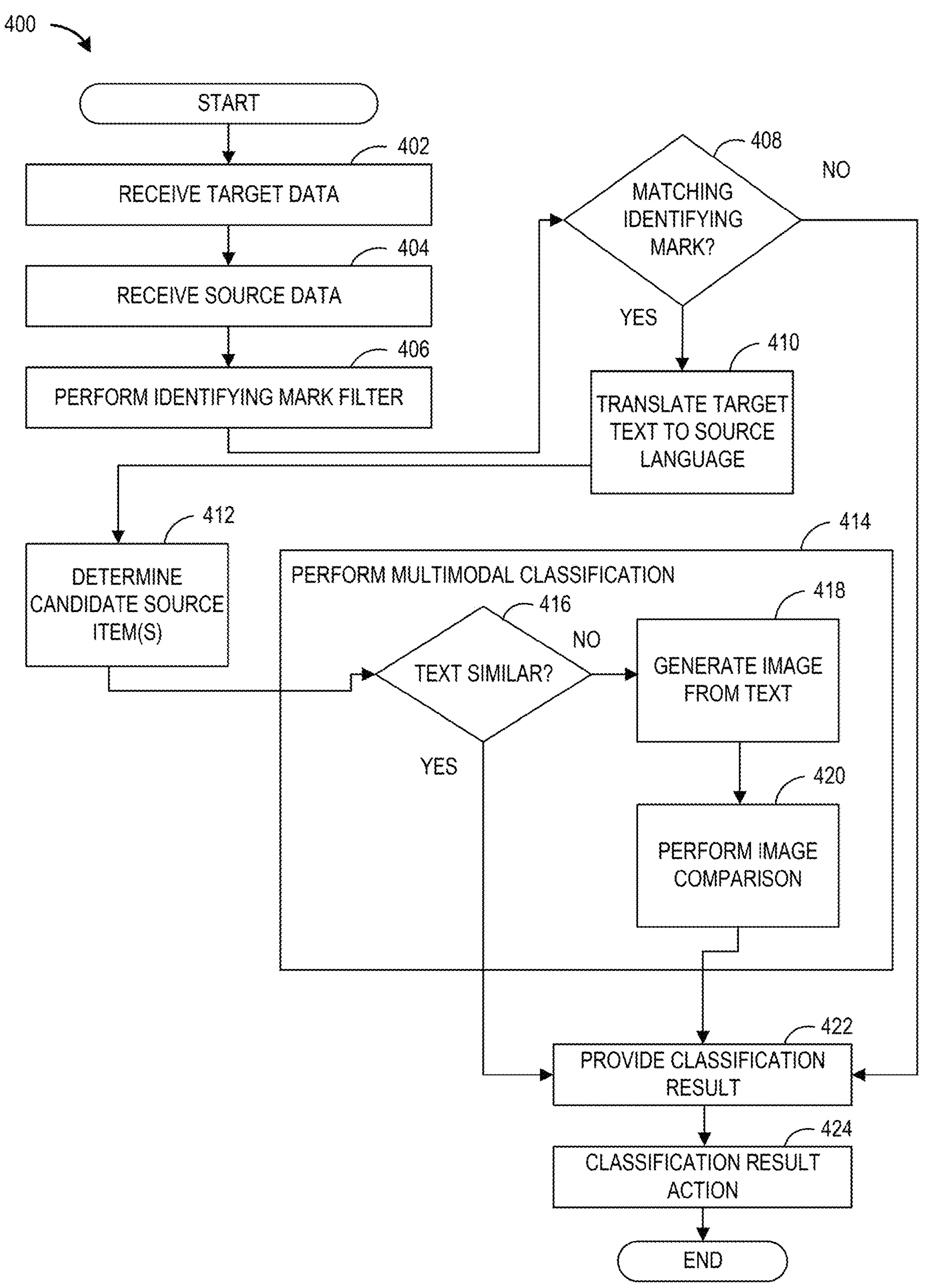
FIG. 4A is a flow chart depicting a method implemented by the multimodal artificial-intelligence search and classification system for item search, comparison, and classification.

FIG. 4A includes a flow chart depicting a computer-implemented method 400 for item search, comparison, and classification. The method 400 can enable filtering of source items to determine a candidate source item to be compared to a target item. The comparison between the candidate source item and the target item can be used to determine whether the target item has or does not have a matching item in the source electronic catalog. As described herein, the multimodal AI search and classification system 104 can process multiple target items. In some cases, the method 400 processes a target item and results in a classification result indicating that the target item does not have a match with any source item from the source electronic catalog. In other cases, the method 400 processes another target item and results in a classification result indicating that the second target item does have a match with a source item from the source electronic catalog. In particular, the system 104 can process many target items and many source items. A result of the method 400 can be that many target items are matched with many source items-a many-to-many relationship between target items and source items. As described herein, aspects of the multimodal AI search and classification system 104 may be implemented with the server 201 of FIG. 2. Also, as described herein, the multimodal AI search and classification system 104 can include an item filter 108 and a multimodal classifier 110, which may implement aspects of the method 400. As described herein, the server 201 can implement aspects of the method 400. Additional details regarding the method 400 are provided herein, such as with respect to FIGS. 1A, 1B, 1C, and 3A.

Beginning at block 402, target data can be received. The item ingester 106 can receive target item data from the crawler 102. The crawler 102 can extract data regarding multiple target items from the target electronic catalog 118B. In particular, the item ingester 106 can receive data for a target item, such as, but not limited to, (i) a target identifying mark (such as a brand), (ii) a target item category, and (iii) target item text (such as an item name or item title). As described herein, the target item text can be in a target language. The item ingester 106 can process many target items.

At block 404, source data can be received. The item ingester 106 can receive source item data from the source electronic catalog 118A. The item ingester 106 can receive data for multiple source items. The item ingester 106 can receive data for a source item, such as, but not limited to, (i) a source identifying mark (such as a brand), (ii) a source item category, and (iii) source item text (such as an item name or item title). The source item data can include catalog image data. As described herein, the source item text can be in a source language.

At block 406, a filter can be performed on the target identifying mark. The item filter 108 can receive or determine a set of source identifying marks from the source electronic catalog 118A. The item filter 108 can compare multiple source identifying marks with the target identifying mark. The item filter 108 can select, from the set of source identifying marks, a source identifying mark based at least in part on textual similarity between the target identifying mark and the first source identifying mark. The item filter 108 can determine textual similarity with a language model. In some embodiments, the item filter 108 generates by the language model, based at least in part on the target identifying mark, a target identifying mark embedding, such as a vector embedding. The item filter 108 generates by the language model, based at least in part on the source identifying mark, a source identifying mark embedding. The item filter 108 applies a cosine similarity function to the target identifying mark embedding and the source identifying mark embedding that outputs a similarity score. The item filter 108 can determine whether the similarity score satisfies a threshold (such as 0.7. for example). In some embodiments, a different language model approach can be used, such as providing source identifying marks to a language model and a prompt to the model to answer whether the marks are the same or not.

At block 408, it can be determined whether a matching identifying mark has been identified. In some embodiments, the item filter 108 determines whether the similarity score or indicator satisfies a threshold. If yes, then the method 400 proceeds to block 410 to translate target item text. Otherwise, a matching identifying mark has not been identified, and the method 400 proceeds to block 422 to provide a classification result that a match has not been identified. An advantage for checking for identifying marks is that the method 400 can shortcut to a determination that the target item is not found in the source electronic catalog.

At block 410, target item text can be translated to the source language. The item filter 108 can generate by a translation model, based at least in part on the target item text (such as an item name), translated target item text in the source language. In some cases, the source and target languages are the same and translation may not be necessary. The translation model can receive the source and target languages as input. An example translation model is a multilingual encoder-decoder that can perform multilingual translations.

At block 412, one or more candidate source items can be determined. The item filter 108 can constrain the search space of source items by filtering on identifying mark and item category. The item filter 108 can determine, from data for the source items, a data set for the source items associated with (i) an identifying mark textually similar to the determined source identifying mark and (ii) an item category textually similar the target item category. In some embodiments, the item filter 108 can use embeddings to determine textual similarity, which can include semantic search. Textually similarity can include exact matches. For example, since a source identifying mark has been identified to be present, identifying source items with the determined identifying mark can be based on exact matches.

In some embodiments, the item filter 108 can use embeddings to determine textual similarity of source identifying marks, as described herein. The item filter 108 can use embeddings to determine textual similarity of item categories. The item filter 108 can determine a source item category associated with a source item. The item filter 108 generates by a language model, based at least in part on the target item category, a target item category embedding. The item filter 108 generates by the language model, based at least in part on the source item category, a source item category embedding. The item filter 108 applies a cosine similarity function to the target item category embedding and the source item category embedding that outputs a similarity score. The item filter 108 can determine whether the similarity score satisfies a threshold. In some embodiments, a different language model approach can be used, such as providing item categories to a language model and a prompt to the model to answer whether the categories are the same or not.

Once the search space has been constrained, the item filter 108 can determine one or more candidate source items. The item filter 108 can use the target item text (which can be a translated item name) and source item text (such as source item name) to identify candidate source items. The item filter 108 can determine, from the data set for the source items, a source text embedding for each source item text (such as item name). The item filter 108 determines a target name embedding for the target item text (which can be translated). The item filter 108 determines, from the data set for the source items, data for a candidate source item based at least in part on a respective source text embedding and the target text embedding. The item filter 108 can apply a cosine similarity function (i) to the target text embedding and (ii) a first source text embedding that outputs a cosine similarity score. The item filter 108 can determine that the cosine similarity score satisfies a threshold.

In some embodiments, the item filter 108 can determine candidate source items with a ranking. The item filter 108 determines a ranking for the data set for the source items. The item filter 108 selects, from the data set for the source items, the data for the candidate source item based at least in part on the ranking. The item filter 108 can rank source items based on a text overlap score. The item filter 108 can determine a text overlap score based at least in part on the target item text and the source item text. The item filter 108 can calculate a text overlap score based on matching words (0.95 can indicate 95% matching words) between the source item text and the target item text. As described herein, for text overlap score purposes, two words can match when one word is contained within another word and/or has the same stem (for example, "Motherboard" and "Motherboards" would be a match). Also, as described herein, if two source items have the same text overlap score, then the item filter 108 can use another similarity score (such as a cosine similarity score) for tie breakers and select the source item with the higher other similarity score (such as the cosine similarity score). The item filter 108 can apply a cosine similarity function (i) to the target text embedding and (ii) a source text embedding that outputs a cosine similarity score. The item filter 108 orders the source items by text overlap score and can select K source items with the highest text overlap scores (and, for tie breakers, use another similarity score to order items).

In other embodiments, the item filter 108 can rank source items based on a combined similarity score from text similarity scores, such as cosine similarity and overlap score. The item filter 108 can combine the cosine similarity score and the text overlap score that results in a combined similarity score. The item filter 108 orders the source items by combined similarity score and can select K source items with the highest similarity scores.

At block 414, multimodal classification can be performed. The multimodal classifier 110 can process each of the one or more candidate source item(s). The block 414 for performing multimodal classification can include the blocks 416, 418, 420 for checking text similarity, generating image data, and performing image comparisons.

At block 416, text similarity is performed. The multimodal classifier 110 can determine textual similarity indicator based at least in part on (i) the target item text and (ii) item text associated with the candidate source item. The textual similarity indicator can be a chunked similarity score. The multimodal classifier 110 can determine a first set of word chunks from the target item text. The multimodal classifier 110 can determine a second set of word chunks from the item text associated with the candidate source item. The multimodal classifier 110 can determine a chunked similarity score from the first set of word chunks and the second set of word chunks. The multimodal classifier 110 can determine that the textual similarity indicator satisfies a threshold (such as 0.7 for example). As described herein, such as with respect to FIG. 3A, the multimodal classifier 110 can use mean chunk cosine similarity and/or maximum chunk cosine similarity to determine the textual similarity indicator. An advantage of chunked similarity score is that the comparison operation can be performed relatively fast.

In some embodiments, the multimodal classifier 110 can use an alternative natural language approach for textual similarity. For example, the multimodal classifier 110 can generate by a language model, based at least in part on (i) the second target item name, (ii) the item name associated with the second candidate source item, and (iii) a prompt asking whether items identifiable from input data are the same or different, the textual similarity indicator. The multimodal classifier 110 can determine that the textual similarity indicator satisfies a threshold, such as checking whether the indicator includes the text "SAME" or "DIFFERENT."

If textual similarity is determined, the method 400 can proceed to block 422 to provide a classification result that a match has been determined. If textual similarity is not determined (in that a threshold has not been satisfied yet), the method 400 proceeds to block 418 to generate image data from text. As described herein, only proceeding with image comparisons can be a performance improvement by avoiding additional computations where textual similarity has been sufficiently identified.

At block 418, image data can be generated from text. The multimodal classifier 110 can generate by an image generator model, based at least in part on (i) the target item text and (ii) a prompt instruction to generate a catalog image, target image data. In some embodiments, the image generator model can be multilingual and the target item text need not be translated. The image generator model can be or correspond to a multilingual image generator model. The image generator model can be configured to receive a text prompt and output image data corresponding to the text prompt. The multimodal classifier 110 can generate the target image data with the image generator model that receives the target text in a target language as a prompt. The prompt provided to the image generator model can include an instruction for the image generator model to generate a catalog style image (such as having a clear background). The image generator model receives the target item text (which can be in the original target language or not) and generates image data corresponding to the target item text. As described herein, the candidate source item can be associated with image data.

At block 420, an image comparison can be performed. The multimodal classifier 110 can use a computer vision system to determine an image similarity indicator based at least in part on the target image data and source image data associated with the candidate source item. The multimodal classifier 110 can determine a target image embedding for the target image data and determine a source image embedding for source image data associated with the candidate source item. The multimodal classifier 110 can use a vision transformer. The vision transformer can receive the generated target image data and generate a target image embedding based at least in part on the generated target image data. The vision transformer can also receive the source image data and generate a source image embedding based at least in part on the source image data. The multimodal classifier 110 determines an image similarity indicator (such as a cosine similarity value) based at least in part on the target image embedding and the source image embedding. The multimodal classifier 110 can apply a cosine similarity function to the target image embedding and the source image embedding that outputs the image similarity indicator. The multimodal classifier 110 determines whether the image similarity indicator satisfies or fails a threshold (such as 0.15). If the image similarity indicator satisfies the threshold, then a positive classification result match has been identified. If the image similarity indicator fails to satisfy the threshold, then a classification result match has not been identified.

In some embodiments, a different type of image comparison can be performed. The multimodal classifier 110 can generate by a multimodal language model, based at least in part on (i) the target image data, (ii) the source image data, and (iii) a prompt asking whether items in images associated with the target image data and the source image data are the same or different, the image similarity indicator. The multimodal classifier 110 can determine that the image similarity indicator satisfies a threshold, such as checking whether the indicator includes the text "SAME" or "DIFFERENT."

At block 422, the classification result can be provided. In the case of a negative classification result, the multimodal classifier 110 can provide the classification result indicating that the target item does not have a match with any source item from the source electronic catalog 118A. In the case of a positive classification result, the multimodal classifier 110 can provide a classification result indicating that the target item matches the candidate source item. The multimodal classifier 110 can store the classification result in the result store 122.

At block 424, an action can be performed based on the classification result. For example, if the classification result is positive (a match has been found), then the system 104 can cause the candidate source item to be automatically included in an electronic catalog destined for the target region. Conversely, if the classification result is negative (a match has not been found), then the system 104 can cause an automatic request for the target item to be included in an electronic catalog destined for the target region. In some embodiments, the automatic actions may be overridden manually and/or subject to review by a reviewer, such as legal or compliance.

Figure 4B:
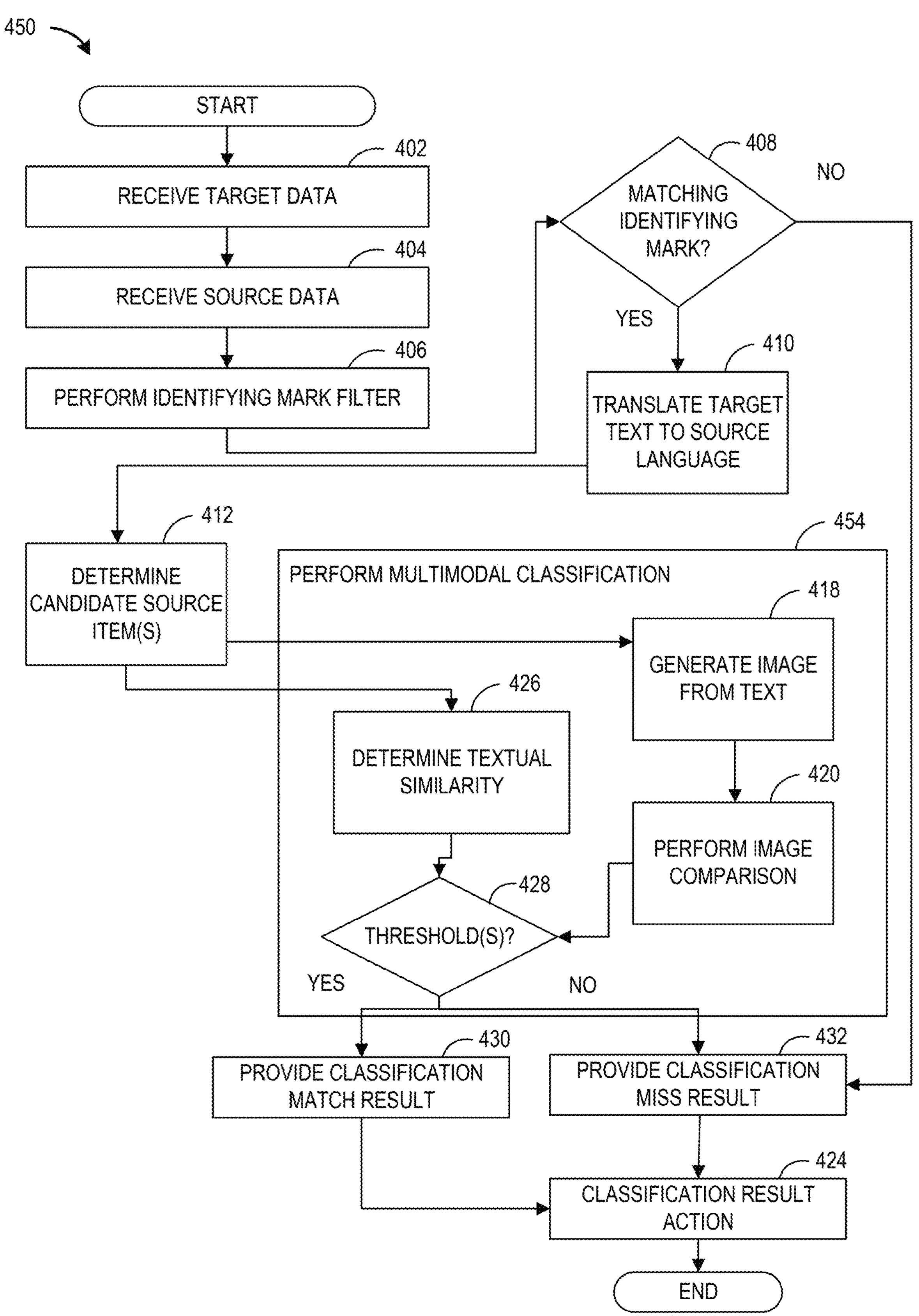
FIG. 4B is a flow chart depicting another method implemented by the multimodal artificial-intelligence search and classification system for item search, comparison, and classification.

FIG. 4B includes a flow chart depicting another computer-implemented method 450 for item search, comparison, and classification. The method 450 can determine whether a target item has or does not have a matching item in a source electronic catalog. The method 450 of FIG. 4B can be similar to the method 400 of FIG. 4A. However, unlike the method of 400 of FIG. 4A where there can be a shortcut to provide a classification result without performing image comparisons, the method 450 of FIG. 4B may not have the same shortcut. The item filter 108 and a multimodal classifier 110 may implement aspects of the method 450. As described herein, the server 201 can implement aspects of the method 450. Additional details regarding the method 450 are provided herein, such as with respect to FIGS. 1A, 1B, 1C, and 3B.

Beginning at block 402, target data can be received. The item ingester 106 can receive target item data from the crawler 102. The block 402 of FIG. 4B for receiving target data can be similar to or the same as the block 402 of FIG. 4A for receiving target data.

At block 404, source data can be received. The item ingester 106 can receive source item data from the source electronic catalog 118A. The block 404 of FIG. 4B for receiving source data can be similar to or the same as the block 404 of FIG. 4A for receiving source data.

At block 406, a filter can be performed on the target identifying mark. The item filter 108 can receive or determine a set of source identifying marks from the source electronic catalog 118A. The block 406 of FIG. 4B for performing a filter on the target identifying can be similar to or the same as the block 406 of FIG. 4A for performing the filter on the target identifying.

At block 408, it can be determined whether a matching identifying mark has been identified. In some embodiments, the item filter 108 determines whether the similarity score or indicator satisfies a threshold. If yes, then the method 400 proceeds to block 410 to translate target item text. Otherwise, a matching identifying mark has not been identified, and the method 400 proceeds to block 432 to provide a classification result that a match has not been identified.

At block 410, target item text can be translated to the source language. The item filter 108 can generate by a translation model, based at least in part on the target item text (such as an item name), translated target item text in the source language. The block 410 of FIG. 4B for translating target item text can be similar to or the same as the block 410 of FIG. 4A for translating target item text.

At block 412, one or more candidate source items can be determined. The item filter 108 can constrain the search space of source items by filtering on identifying mark and item category. Once the search space has been constrained, the item filter 108 can determine one or more candidate source items. The item filter 108 can use the target item text (which can be a translated item name) and source item text (such as source item name) to identify candidate source items. The block 412 of FIG. 4B for determining one or more candidate source items can be similar to or the same as the block 412 of FIG. 4A for determining one or more candidate source items.

At block 454, multimodal classification can be performed. The multimodal classifier 110 can process each of the one or more candidate source item(s). The block 454 for performing multimodal classification can include the blocks 426, 418, 420, 428 for checking text similarity, generating image data, performing image comparisons, and checking one or more thresholds.

At block 426, text similarity is performed. The multimodal classifier 110 can determine textual similarity indicator based at least in part on (i) the target item text and (ii) item text associated with the candidate source item. As described herein, the textual similarity indicator can be a chunked similarity score. The block 426 of FIG. 4B for performing textual similarity can be similar to the block 416 of FIG. 4A for performing textual similarity. However, as described herein, unlike the block 416 of FIG. 4A for performing textual similarity where there can be a shortcut to provide a classification result without performing image comparisons, the block 426 of FIG. 4B for performing textual similarity proceeds to block 426 for checking one or more thresholds.

At block 418, image data can be generated from text. The multimodal classifier 110 can generate by an image generator model, based at least in part on (i) the target item text and (ii) a prompt instruction to generate a catalog image, target image data. The block 418 of FIG. 4B for generating image data from text can be similar to or the same as the block 418 of FIG. 4A for generating image data from text.

At block 420, an image comparison can be performed. The multimodal classifier 110 can use a computer vision system to determine an image similarity indicator based at least in part on the target image data and source image data associated with the candidate source item. The block 420 of FIG. 4B for performing an image comparison can be similar to the block 420 of FIG. 4A for performing an image comparison. As described herein, the multimodal classifier 110 can determine a target image embedding for the target image data and determine a source image embedding for source image data associated with the candidate source item. The multimodal classifier 110 can apply a cosine similarity function to the target image embedding and the source image embedding that outputs the image similarity indicator. In some embodiments, a different type of image comparison can be performed. The multimodal classifier 110 can generate by a multimodal language model, based at least in part on (i) the target image data, (ii) the source image data, and (iii) a prompt asking whether items in images associated with the target image data and the source image data are the same or different, the image similarity indicator. The blocks 418 and 420 for generating image data and performing an image comparison can be before, after, or in parallel with the block 426 for determining textual similarity.

At block 428, it can be determined whether one or more thresholds are satisfied based at least in part on the textual similarity indicator and the image similarity indicator. In some embodiments, the multimodal classifier 110 determines whether the textual similarity indicator satisfies a first threshold (such as the chunked similarity score exceeds a 0.7 threshold). The multimodal classifier 110 can also determine whether the image similarity indicator satisfies a second threshold (such as the cosine similarity value exceeding a 0.15 threshold). If both conditions are satisfied (which can be referred to as a logical AND condition), then the multimodal classifier 110 can determine that the items match and the method 450 proceeds to block 430 to provide a classification match result. Otherwise, the method 450 proceeds to block 432 to provide a classification miss result.

In other embodiments, the multimodal classifier 110 can determine a combined indicator from the textual similarity indicator (such as a chunked similarity score) and the image similarity indicator (such as a cosine similarity value). The multimodal classifier 110 determines whether the combined indicator satisfies a threshold. If threshold is satisfied, then the method 450 proceeds to block 430 to provide a classification match result; otherwise, the method 450 proceeds to block 432 to provide a classification miss result.

At block 424, an action can be performed based on the classification result. The block 424 of FIG. 4B for performing an action based on the classification result can be similar to or the same as the block 424 of FIG. 4A for performing an action based on the classification result. If the classification result is positive (a match has been found), then the system 104 can cause the candidate source item to be automatically included in an electronic catalog destined for the target region. Conversely, if the classification result is negative (a match has not been found), then the system 104 can cause an automatic request for the target item to be included in an electronic catalog destined for the target region.

As described herein, in some embodiments, language translation is not necessary. For example, the target region and the source region can use the same language. In some embodiments, identifying marks (such as brands) may not be used to filter items. For example, in some embodiments, a match may be allowed where two different items have different identifying marks but are otherwise textually similar and/or visually similar.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor ("DSP"), an ASIC, an FPGA or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:

one or more data storage media configured to store specific computer-executable instructions; and one or more computer hardware processors configured to communicate with the one or more data storage media, wherein the specific computer-executable instructions are configured to cause the one or more computer hardware processors to at least:

receive data for a first target item comprising (i) a target identifying mark, (ii) a target item category, and (iii) a target item name in a target language;

determine a set of source identifying marks received from a source electronic catalog comprising data for a plurality of source items, wherein the plurality of source items are filtered to determine a candidate source item to be compared to the first target item, wherein a comparison between the candidate source item and the first target item is used to determine whether the first target item has or does not have a matching item in the source electronic catalog, and wherein data for each source item from the plurality of source items comprises (i) a source identifying mark, (ii) a source item category, and (iii) a source item name in a source language;

select, from the set of source identifying marks, a first source identifying mark based at least in part on textual similarity between the target identifying mark and the first source identifying mark;

generate by a translation model, based at least in part on the target item name, a translated target item name in the source language;

determine, from the data for the plurality of source items, a data set for the source items associated with (i) an identifying mark textually similar to the first source identifying mark and (ii) an item category textually similar the target item category;

determine, from the data set for the source items, a source name embedding for each source item name;

determine a target name embedding for the translated target item name;

determine, from the data set for the source items, data for a candidate source item based at least in part on a respective source name embedding and the target name embedding;

generate by an image generator model, based at least in part on (i) the target item name and (ii) a prompt instruction to generate a catalog image, target image data;

determine a target image embedding for the target image data;

determine a source image embedding for source image data associated with the candidate source item;

determine an image similarity indicator based at least in part on the target image embedding and the source image embedding;

determine that the image similarity indicator fails to satisfy a second threshold; and provide a first classification result indicating that the first target item does not have a match with any source item from the plurality of source items from the source electronic catalog.

2. The system of claim 1, wherein to select the first source identifying mark based at least in part on textual similarity between the target identifying mark and the first source identifying mark, further computer-executable instructions configure the one or more computer hardware processors to at least:

generate by a language model, based at least in part on the target identifying mark, a target identifying mark embedding;

generate by the language model, based at least in part on the source identifying mark, a source identifying mark embedding;

apply a cosine similarity function to the target identifying mark embedding and the source identifying mark embedding that outputs a similarity score; and determine that the similarity score satisfies a third threshold.

3. The system of claim 1, wherein to determine the data set for the source items, further computer-executable instructions configure the one or more computer hardware processors to at least:

determine a first source item category associated with a first source item from the plurality of source items;

generate by a language model, based at least in part on the target item category, a target item category embedding;

generate by the language model, based at least in part on the first source item category, a source item category embedding;

apply a cosine similarity function to the target item category embedding and the source item category embedding that outputs a similarity score; and determine that the similarity score satisfies a third threshold.

4. The system of claim 1, wherein further computer-executable instructions configure the one or more computer hardware processors to at least:

process, from a plurality of target items, a second target item that results in a second classification result indicating that the second target item does have a match with a source item from the plurality of source items from the source electronic catalog.

5. The system of claim 1, wherein to determine the data for the candidate source item from the data set for the source items, further computer-executable instructions configure the one or more computer hardware processors to at least:

determine a ranking for the data set for the source items; and select, from the data set for the source items, the data for the candidate source item based at least in part on the ranking.

6. The system of claim 5, wherein to determine the ranking for the data set for the source items, additional computer-executable instructions configure the one or more computer hardware processors to at least:

determine a first text overlap score based at least in part on the translated target item name and an item name for the first source item; and order the data set for the source items based at least in part on the first text overlap score and a second text overlap score.

7. A computer-implemented method comprising:

receiving data for a target item comprising (i) a target identifying mark, (ii) a target item category, and (iii) a first target item name;

determining a set of source identifying marks received from a source electronic catalog comprising data for a plurality of source items, wherein data for each source item from the plurality of source items comprises (i) a source identifying mark, (ii) a source item category, and (iii) a source item name;

selecting, from the set of source identifying marks, a first source identifying mark based at least in part on textual similarity between the target identifying mark and the first source identifying mark;

determining, from data for the plurality of source items, a data set for the source items with (i) an identifying mark textually similar to the first source identifying mark and (ii) an item category textually similar the target item category;

determining, from the data set for the source items, a source name embedding for each source item name;

determining a target name embedding based at least in part on the first target item name;

determining, from the data set for the source items, a candidate source item based at least in part on the source name embedding and the target name embedding;

generating by an image generator model, based at least in part on (i) the first target item name and (ii) a prompt instruction to generate a catalog image, target image data;

determining, by a computer vision system, an image similarity indicator based at least in part on the target image data and source image data associated with the candidate source item;

determining that the image similarity indicator fails to satisfy a first threshold; and providing a first classification result indicating that the target item does not have a match with any source item from the plurality of source items from the source electronic catalog.

8. The computer-implemented method of claim 7, further comprising:

receiving a second target item name associated with a second target item;

determining a second candidate source item based at least in part on the second target item name; and determining a second classification result for the second target item and the second candidate source item, wherein determining the second classification result further comprising:

determining a textual similarity indicator based at least in part on (i) the second target item name and (ii) an item name associated with the second candidate source item;

determining that the textual similarity indicator satisfies a second threshold; and identifying the second classification result that the second target item matches the second candidate source item without performing an image comparison for the second target item and the second candidate source item.

9. The computer-implemented method of claim 8, wherein determining the textual similarity indicator further comprises:

determine a first set of word chunks from the second target item name;

determine a second set of word chunks from the item name associated with the second candidate source item; and determine a textual similarity indicator from the first set of word chunks and the second set of word chunks.

10. The computer-implemented method of claim 8, wherein determining the textual similarity indicator further comprises:

generating by a language model, based at least in part on (i) the second target item name, (ii) the item name associated with the second candidate source item, and (iii) a prompt asking whether items identifiable from input data are the same or different, the textual similarity indicator.

11. The computer-implemented method of claim 7, wherein determining the image similarity indicator further comprises:

generating by a multimodal language model, based at least in part on (i) the target image data, (ii) the source image data, and (iii) a prompt asking whether items in images associated with the target image data and the source image data are the same or different, the image similarity indicator.

12. The computer-implemented method of claim 7, wherein the source identifying mark comprises a brand.

13. The computer-implemented method of claim 7, wherein determining the image similarity indicator further comprises:

determining a target image embedding for the target image data;

determining a source image embedding for the source image data; and applying a cosine similarity function to the target image embedding and the source image embedding that outputs the image similarity indicator.

14. A system comprising:

one or more data storage media configured to store specific computer-executable instructions; and one or more computer hardware processors configured to communicate with the one or more data storage media, wherein the specific computer-executable instructions are configured to cause the one or more computer hardware processors to at least:

receive data for a first target item comprising (i) a target identifying mark, (ii) a target item category, and (iii) target text;

select, from a set of source identifying marks, a first source identifying mark based at least in part on textual similarity between the target identifying mark and the first source identifying mark;

determine, from data for a plurality of source items, a first candidate source item with (i) a source identifying mark textually similar to the first source identifying mark and (ii) a source item category textually similar to the target item category, wherein the first candidate source item is associated with source text;

determine a textual similarity indicator based at least in part on the target text and the source text;

generate by an image generator model, based at least in part on the target text, target image data;

determine, by a computer vision system, an image similarity indicator based at least in part on the target image data and source image data associated with the first candidate source item;

determine that one or more thresholds are satisfied based at least in part on the textual similarity indicator and the image similarity indicator; and provide a first classification result indicating that the first target item matches the first candidate source item.

15. The system of claim 14, wherein to select the first source identifying mark based at least in part on textual similarity between the target identifying mark and the first source identifying mark, further computer-executable instructions configure the one or more computer hardware processors to at least:

generate by a language model, based at least in part on the target identifying mark, a target identifying mark embedding;

generate by the language model, based at least in part on the source identifying mark, a source identifying mark embedding;

apply a cosine similarity function to the target identifying mark embedding and the source identifying mark embedding that outputs a similarity score; and determine that the similarity score satisfies a threshold.

16. The system of claim 14, wherein to determine textual similarity between the target text and the source text, further computer-executable instructions configure the one or more computer hardware processors to at least:

generate by a language model, based at least in part on the target text, a target text embedding;

generate by the language model, based at least in part on the source text, a source text embedding;

apply a cosine similarity function to the target text embedding and the source text embedding that outputs a similarity score; and determine that the similarity score satisfies a threshold.

17. The system of claim 14, wherein to determine the image similarity indicator, further computer-executable instructions configure the one or more computer hardware processors to at least:

determine a target image embedding for the target image data;

determine a source image embedding for the source image data; and apply a cosine similarity function to the target image embedding and the source image embedding that outputs the image similarity indicator.

18. The system of claim 17, wherein to determine the target image embedding, additional computer-executable instructions configure the one or more computer hardware processors to at least:

generate, by a vision transformer, the target image embedding based at least in part on the target image data.

19. The system of claim 14, wherein further computer-executable instructions configure the one or more computer hardware processors to at least:

receive text data associated with a second target item;

determine a second candidate source item based at least in part on the text data associated with the second target item; and determine a second classification result for the second target item and the second candidate source item, wherein to determine the second classification result, the further computer-executable instructions configure the one or more computer hardware processors to at least:

determine a chunked similarity score based at least in part on (i) the text data associated with the second target item and (ii) text data associated with the second candidate source item;

determine that the chunked similarity score satisfies a threshold; and identify the second classification result that the second target item matches the second candidate source item without performing an image comparison for the second target item and the second candidate source item.

20. The system of claim 14, wherein the target text is in a target language, wherein the image generator model corresponds to a multilingual image generator model, and wherein to generate the target image data, further computer-executable instructions configure the one or more computer hardware processors to at least:

generate the target image data with the image generator model that receives the target text in the target language as a prompt.

* * * * *